United States Patent
Carter et al.

[19]

[11] Patent Number: 5,973,770
[45] Date of Patent: Oct. 26, 1999

[54] METHOD FOR MEASURING THE RELATIVE PROXIMITY OF AND INTERACTING WITH A PLURALITY OF MEDIA/MOLECULAR STRUCTURES

[75] Inventors: Harold B. Carter, Metairie, La.; Kevin Schehrer, Boulder, Colo.

[73] Assignee: Quantum Imaging, Inc., Metairie, La.

[21] Appl. No.: 09/073,246

[22] Filed: May 6, 1998

[51] Int. Cl.[6] ..................................................... G01C 3/08
[52] U.S. Cl. ...................... 356/4.09; 356/376; 356/4.09; 356/5.09
[58] Field of Search ................................. 356/4.09, 5.09, 356/376

[56] References Cited

U.S. PATENT DOCUMENTS

| | | |
|---|---|---|
| 1,991,192 | 2/1935 | Bucky . |
| 4,247,784 | 1/1981 | Henry . |
| 4,708,483 | 11/1987 | Lorenz . |
| 4,774,403 | 9/1988 | Arts . |
| 4,853,694 | 8/1989 | Tomecek . |
| 4,890,266 | 12/1989 | Woodward . |
| 4,893,933 | 1/1990 | Neiheisel et al. . |
| 5,095,747 | 3/1992 | Smith . |
| 5,164,608 | 11/1992 | Vali et al. . |
| 5,235,398 | 8/1993 | Miller et al. . |
| 5,334,850 | 8/1994 | Ashida . |
| 5,337,289 | 8/1994 | Fasching et al. . |
| 5,648,844 | 7/1997 | Clark . |

*Primary Examiner*—Frank G. Font
*Assistant Examiner*—Reginald A. Ratliff
*Attorney, Agent, or Firm*—Banner & Witcoff, Ltd.

[57] ABSTRACT

Apparatus for determining the level of fluid in a vessel comprises a fixed optical emitter for emitting light into the vessel, a light steering means for steering light emitted by the fixed optical emitter, the light steering means for steering the light to reflect from a surface of one of the vessel and a substance within the vessel, a window for receiving the steered light prior to transmission to the vessel, a detector for receiving light from the vessel, and a processing system for determining distance from the vessel or substance in accordance with a predetermined geometric relationship. The apparatus may additionally comprise a level for determining a number of degrees out of plumb of the vessel. Also, the apparatus may comprise an acoustic transmitter and receiver for determining the depths of first and second liquids in the vessel which are immiscible in one another.

22 Claims, 4 Drawing Sheets

METHOD FOR MEASURING THE RELATIVE PROXIMITY OF AND INTERACTING WITH A PLURALITY OF MEDIA/MOLECULAR STRUCTURES

BACKGROUND OF THE INVENTION

1. Field of the Invention

The method and apparatus of the invention relate generally to the field of measuring and/or interacting with relationships between or among a plurality of media and/or spatial materials, by way of example, to the measurement of quantity of fluid in a container. Sensors which garner naturally inherent, virtual and/or artificially generated frequency/energy emissions are directed toward each media of interest in a constellation of relatively proximate objects. Emitters of focused or non-focused, collimated or non collimated, pulsed or continuous beams of electromagnetic energy may be aimed or directed at one or more of such media and the resultant reflections or returns captured by the same or different sensors. The data and/or images thus obtained can be monitored, verified, processed, manipulated, stored, displayed, communicated and reproduced as desired or required.

2. Related Background Art

The advent of the modem computer has greatly enhanced the fields of absolute and relative measurement and increased the speed at which spatial, geometric and temporal relationships, whether natural, virtual or artificial, may be calculated. Display technology now permits large scale visual reproduction of data and images representing multi-dimensional relative proximity. However, current art does not provide useful, often badly needed, sometimes critical information.

For instance, oil companies may not be cognizant of leaks in storage facilities until serious environmental damage has already occurred. The leak may be so slow from a storage tank in terms of fluid loss over time that the leak is not detectable through available monitoring techniques. Most devices for measuring the contents of containers are incapable of accurately measuring the quantity of material inside the structure. If sufficiently accurate means is provided by the application of currently available technology, then costs may become prohibitive for providing such means. Transport, storage and other functional housings of materials produced by the oil and gas industry are presented here as prime examples of devices where the relationship of cost to accuracy of measurement may contribute to an undesirable and otherwise untenable definition of politically and socially acceptable, albeit, dangerous risks. Anyone experienced in the oil and gas industry knows that a used petroleum storage tank is never really safe. In fact, the incidence of welding accidents and maintenance personnel deaths when such tanks are inspected, cleaned or otherwise maintained are numerous. Even when so-called nitrogen "blankets" are applied to such tanks to prevent accidents from occurring, the accidents can and do occur. Equally devastating, as indicated above, are the environmentally damaging petroleum spills and leaks which are not detected until too late by current methods of content(s) monitoring.

U.S. Pat. No. 5,493,903 describes the application of a strain gauge sensor to the exterior wall of a tank. The greater the volume of a substance within the tank, the greater the force pushing on the tank walls. The greater the force pushing on the tank walls, the greater the deformation of the walls which is translated into a strain gauge reading. An exterior storage tank, however, is not subjected to uniform temperatures and pressures due to weather conditions and the like which can alter the readings over time of day and season. While simple, the solution is not particularly accurate nor does it solve the problem of measuring the contents of underground or otherwise enclosed storage facilities.

Similarly, U.S. Pat. No. 5,487,300 describes the use of a pressure sensor connected to the opening of a tank for indicating the pressure of the liquid in the tank. A processor translates the pressure signal to a level signal. There may, however, be sludge or other measurement distorting material at the opening of the tank where the pressure sensor is located that can clog the opening and distort or interfere with the accuracy of the level reading.

Other known techniques for level detection include using a manual dip stick. However, the use of a dip stick requires that the stick be inserted perpendicularly to the bottom of the container. If the stick is inserted at an angle, the reading will be artificially high. Of course, use of a dip stick is not automatic in that it requires a person's presence to take the reading. Moreover, the person taking the reading, depending on the contents of the container, may have to wear a gas mask or other safety apparatus to prevent inhaling dangerous fumes.

Still other efforts to measure container contents have focused on the use of "pulse radar level measurement" such as various products produced by the Ohmart Corporation of Cincinnati, Ohio. However, such devices are less accurate, generally more expensive and pose difficult installation problems. Further, they lack many features of the current invention including off-site interactive telemetric communication and control.

U.S. Pat. No. 4,774,403 describes a position measuring device using a triangulation scheme for position sensing. According to the invention, a laser light beam is reflected off the surface of container contents differently from when light is reflected off the bottom surface of the container. A lens of a sensor deflects the received light to different locations of a CCD linear array. Also, U.S. Pat. No. 5,337,289 discloses an acoustic surface mapping system useful in mapping the contours of solid container contents.

Current methods do not delineate between the petroleum and water content, particularly in lease storage tanks and even in the tanks located at refineries. Nor do they give early warning of the theft of petroleum products from tanks, many of which are in remote locations. This is particularly problematic in underdeveloped countries where the additional hazard of intentional sabotage may greatly increase the incidence of severe environmental damage and product loss and where many industrialized nations now expend a large portion of their exploration and production budgets. Consequently, it is clear from the prior art that there exists a need for an improved means of acquiring container content information and promptly responding to such information via telemetric directives or other means available in various embodiments of the current invention to avoid the severe consequences that may result from having inaccurate or unreliable measurements.

SUMMARY OF THE INVENTION

In accordance with the present invention, the issues described above are resolved by providing a novel method and apparatus for the collection, assimilation, analysis, communication, display and utilization of information regarding the relative proximity of a plurality of media/molecular structures. The example of the utility of the current invention, ascertaining the petroleum and water content of a tank such as a petroleum storage tank, is described here for illustrative purposes only. The most obvious advantages of the current invention are: high accuracy; repeatable results; frequent measurement; on-demand measurement; the ability to control product loss and/or environmental damage from off-site monitoring facilities; and the less frequent need for on-site personnel. No limitation of the applicability of the invention to other areas of commerce and industry is intended. For example, as will be described herein, the tank may be a floating tank, such as the cargo hold of a tanker ship and the tank may contain many different substances, some far more hazardous than petroleum.

The object of the invention is to provide a means for measuring the distance between a surface, whose position may vary, and a well-known point. Specific to a preferred embodiment described herein, the invention can be used to measure the distance of various fluid levels from the specific physical location of the apparatus of the invention. In the example of the petroleum storage tanks, the invention may be attached to the hatch cover of the existing entrance to the tank. Such a process would eliminate the danger of welding sparks or other potentially dangerous emissions during installation because the hatch cover would be removed from the tank (replaced by another) during the installation of the invention on the original hatch cover. With the additional knowledge of the shape of the container in which the fluid is held there is sufficient information for determining the volume of fluid in the container or the change in the volume of fluid in the container.

The current invention offers a less expensive, safe means of measuring and monitoring the container contents. Utilizing the emission detection device described in U.S. patent application Ser. No. 08/562,947, entitled "A Method for the Capture of Data and Images Utilizing a Minimum of Mechanical Activity", filed Nov. 27, 1995, (now abandoned) and International Patent Application of the same title, PCT/US96/19067 filed Nov. 27, 1996, and incorporated herein by reference, the internal volume of a container such as a tank, a pipe or other vessel is first measured using a processing program. Then an array of detectors using the same concepts is programmed to measure the liquid level of the content of the housing by measuring the temperature and/or other electromagnetic differential between the contents and the interior surfaces such as the walls of the vessel/container. (The terms vessel and container may be used interchangeably herein). The volumetric content of the vessel/container is derived by applying calculus while taking into consideration other variables such as the factors comprising Boyle's law. Periodic or constant monitoring of the contents of a container gives prompt notice of any unintended change. The same apparatus may be used to measure and control content withdrawal and inventory. The utility of this relatively inexpensive device is far reaching and includes preprogrammed gravity centroid maintenance and adjustment for maritime vessels and aircraft.

The novel measuring method and apparatus of the invention may be utilized to measure changes in the proximate relationship of other materials in the petroleum and other industries. In its simplest form, the present invention assumes a tank whose shape and dimensions are known and having a depth that is known. An emitter, for example, an acoustic emitter emits a limited amount of energy which results in an absorption and a degree of reflection from the surface of the liquid and the container. One or more sensors are located in known proximity to the surfaces of the container such that they receive differential readings from the container than from any reflections or emissions from the surface of the contents within the container. In this manner, the readings may be translated into a volume reading of various contents such as fluids in the container that is accurate and reliable, notwithstanding the weather conditions prevalent outside the container.

Moreover, by using fiber optic cable or other materials that can be rendered nonconductive and/or physically separated from the interior of the container for emitting and receiving the energy, there is a decreased risk of an accident as compared to actuating the emitter or applying power or difference in potential to any device(s) inside a container that could cause any damaging event such as an explosion, environmental spill or other accident.

In further embodiments of the invention, the tank may be floating as in an oil tanker vessel on a body of water. The measurements may compare three or more known points on the plane formed by the surface of the liquid in relation to the volume of the container so as to accurately adjust as the liquid moves with the movement of the tanker. Moreover, the shape of the surface of the fluid itself may be detected in a further embodiment. As a tanker moves, waves may form on the surface of a liquid. The surface of a liquid at rest may be assumed to be planar, but in motion, is likely to exhibit waves and variable shapes over time. In such an embodiment, several points on the surface of the liquid may be measured simultaneously so as to form an image of the surface from which accurate volumes of the underlying liquid may be determined. In simpler terms, the image capture unit of the present invention first is applied to capture an image of the empty container and store the same in memory. The captured image can then serve as an important reference for determining the remaining or occupied volume after a liquid is permitted to enter the container.

Another feature of the invention is its capacity to ascertain with relative accuracy the water content of petroleum storage containers. This is accomplished through interrogating the areas (generally the bottom) of the container with electromagnetic and/or acoustic energy. While these water deposits may be in fractal geometric configuration, they may be of sufficient quantity to warrant measurement for various purposes.

The foregoing summary description focuses primarily on environmental spill control and safety. The container may be stationary, or, in a more complicated setting, floating and/or mobile. It is neither exhaustive nor exclusionary, but illustrative of one category of use of the current invention. The same concepts are applicable to maritime, air and land transportation systems such as oil tank cars and cargo planes.

The current invention is a novel method of and apparatus for determining geometric relationships which may be converted to useful numeric expressions for employment in all areas of commerce and industry.

BRIEF DESCRIPTION OF THE DRAWINGS

For a more complete understanding of the invention, one should refer to the embodiment illustrated in greater detail in the accompanying drawing and described below by way of examples of the invention.

In the drawings.

Figure 1:
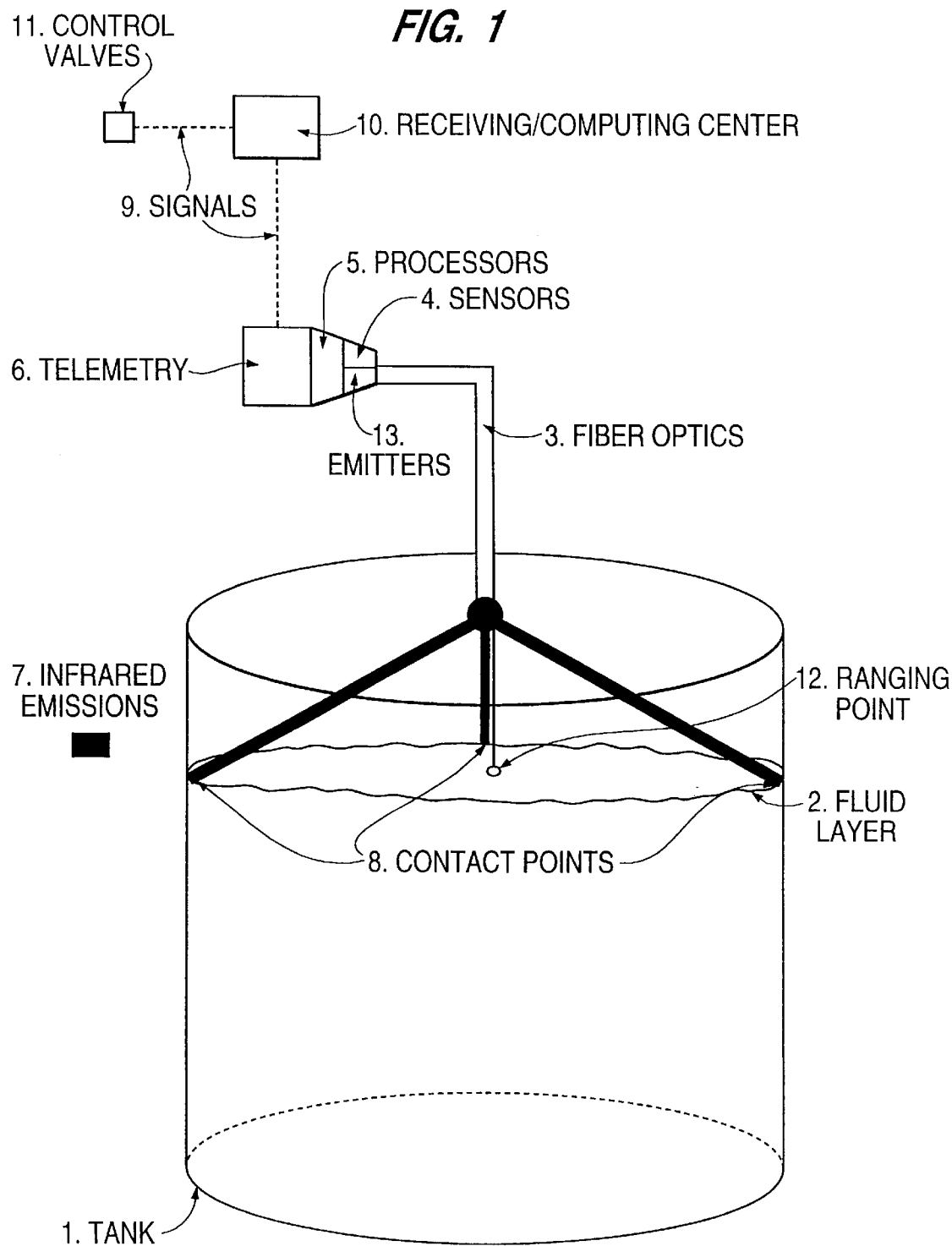
FIG. 1 comprises a perspective view useful in describing in very general terms the invention when used in monitoring the fluid content of a container such as an oil storage tank.

It should be understood that the drawings are not necessarily to exact scale, and that certain aspects of the embodiment are illustrated by graphic symbols, schematic representations and fragmentary views. It should also be understood that when referring to physical relationships by terms such as "upper", "lower", "upward", "downward", "vertical", "horizontal", "left", "right" or the like, such terms have reference solely to the orientation depicted in the drawing. Actual embodiments or installations thereof may differ.

While much mechanical detail, including other plan and section views of the particular embodiment depicted have been omitted, such detail is not per se part of the present invention and is considered within the comprehension of those skilled in the art in light of the present disclosure. The resulting simplified presentation is believed to be more readable and informative and readily understandable by those skilled in the art.

DETAILED DESCRIPTION OF THE INVENTION

Referring to the figures, FIG. 1 illustrates a tank, the fluid level of which is being monitored using the method and apparatus of the invention. The tank has a known shape, known dimensions and known volume. Before liquid enters the tank, the tank is imaged using the emitter and sensor apparatus of the present invention. Typically, the sensor is capable of receiving an image of an object which, via focusing means for focusing on that object has determinable distance from the sensor, much to the same extent as a rangefinder is utilized in a camera. In this manner, the actual volumetric shape of the container can be compared with and calibrated against the actual or predetermined characteristics of the container at rest (not under compression, tension or adverse temperature or other extremes). Once the tank receives a volume of liquid, the tank 1, and the level of its contents, the fluid 2, are interrogated by emitters 13 to the sensors 4, via a fiber optic cable 3, which collects emissions 7, from contact points 8, where the surface of the fluid meets the wall of the tank.

Since many tanks are located underground, their precise dimensions and orientation are difficult to measure. Initially, these dimensions must be determined with reasonable accuracy. Then the interior of the tank can be measured with knowledge of its approximate fluid content, ascertained by conventional means. Next, sensors detecting electromagnetic emissions usually outside the visible region of the spectrum (generally below 400 nanometers and above 700 nanometers) confirm the precise fluid level of the contents. Thereafter a "timegating" mechanism similar to a rangefinder can find a ranging point 12, and can supply the only unknown in the equation needed to measure the contents of the tank.

In a simplified embodiment of the present invention, a fiber optic cable 3 for conducting energy of emitters 13 to the container for illuminating the tank 1 as needed and for receiving and transmitting received readings to remote sensors 4 is not used. In such a simplified embodiment, a sensor, a light source and focusing means (in the form of a rangefinder) are all mounted interior to the tank. This embodiment may be utilized for less hazardous liquids such as water. According to another embodiment, all measurements are captured and emissions 7 required enter and leave the container through a fiber optic cable 3 (or via a nonconductive separating, transmissive media), eliminating any possibility of introducing potentially dangerous, electrical or electromagnetic activity into the container. The fiber optic cable or other media is a conduit or window for communicating information to the sensors 4, which, in turn, provide the captured signals in digital form to a processor or processors 5. The processors may be remotely located and so coupled to the sensors via a communications link (not shown). In the depicted embodiment, the processed data signals 9 are forwarded to a remote receiving/computing center 10. There the raw digital data may be further processed and, if necessary, formed into image data for display. For example, in the case of a moving storage tank, the surface of the liquid may be displayed or processed over time to provide an indication of any fluid loss and/or dangerous wave effects that may adversely influence the flying behavior of an aircraft, the stability of mobile land transport systems or of a tanker ship in which the tank is located or endanger the environment in the vicinity of any such containers.

The computing center 10 may compare an expected depth reading with a determined depth reading or compare a depth reading with a similar reading over time and determine that a reading is out of limits, for example, suggesting an environmental spill, or the absence of a periodic reading may indicate a problem. The computing center 10 then may provide further output signals 9 for activating certain control valves or other output devices 11 that can cause tank closure, evacuation, pressure release and/or other responses such as the release of fire retarding/extinguishing materials appropriate to the management of various adverse conditions and/or to give warning to proximately located inhabitants, for example, of the potential release into the ambient environment of toxic or hazardous substances. Output signals may trigger automatic dialing equipment to alert proximate residents of imminent danger, or weather emergency broadcast systems may be signaled to display warnings as captioning of a television broadcast in a known manner. Moreover, the output signals may have other influences on container content actions. The output signals may have direct influence on other than container related valves and the like. For example, the output signals may provide an input to automatic steering and/or navigational equipment to impact the aircraft or tanker ship's navigational corrections to further promote as level and non-turbulent a flight/passage as possible for the cargo and crew and/or give early warning to those personnel in control of air, land or sea transportation facilities of the impending dangers of actual or potential content spillage.

FIGS. 2A and B are schematic depictions of a more specific and preferred embodiment of the invention, particularly in tanks that are already in place. In this embodiment, a laser 100 is used as the light source owing to its ready and inexpensive availability and simplification in engineering other related components due to its relative inherent collimation. Alternatively, any collimated source can be used and the source can be polychromatic and need not be spatially or temporally coherent. The laser 100 is housed in the source housing 200, which protects the assemblies inside the housing from the environment.

The laser 100, when ON, is incident on a steering mirror 105 which is preferably made of polycarbonate and coated with passivated aluminum. Alternatively this steering optic could be reflectively coated glass, or other moldable material. The steering optic 105 can also be a prism or other molded or ground optical component that can redirect the direction of the laser light and may or may not have optical power in one or more axes. In particular, the steering optic 105 can be a polygon such that the range through which the beam is steered by any single facet of the polygon is approximately equal to, but greater than, the range of angles corresponding to the range of physically realizable distances to a spectrally reflecting interface.

The steering optic 101 is attached to a shaft 110 that is rotated by an electrically driven motor 115. Alternatively, the motor 115 can be replaced by a piezoelectrically driven rotation stage with a steering optic attached thereto, or it can be replaced by a mechanically driven rotation stage via a worm drive and a stepping or continuous motor. In a preferred embodiment the motor can be driven bidirectionally or continuously.

Figure 2:
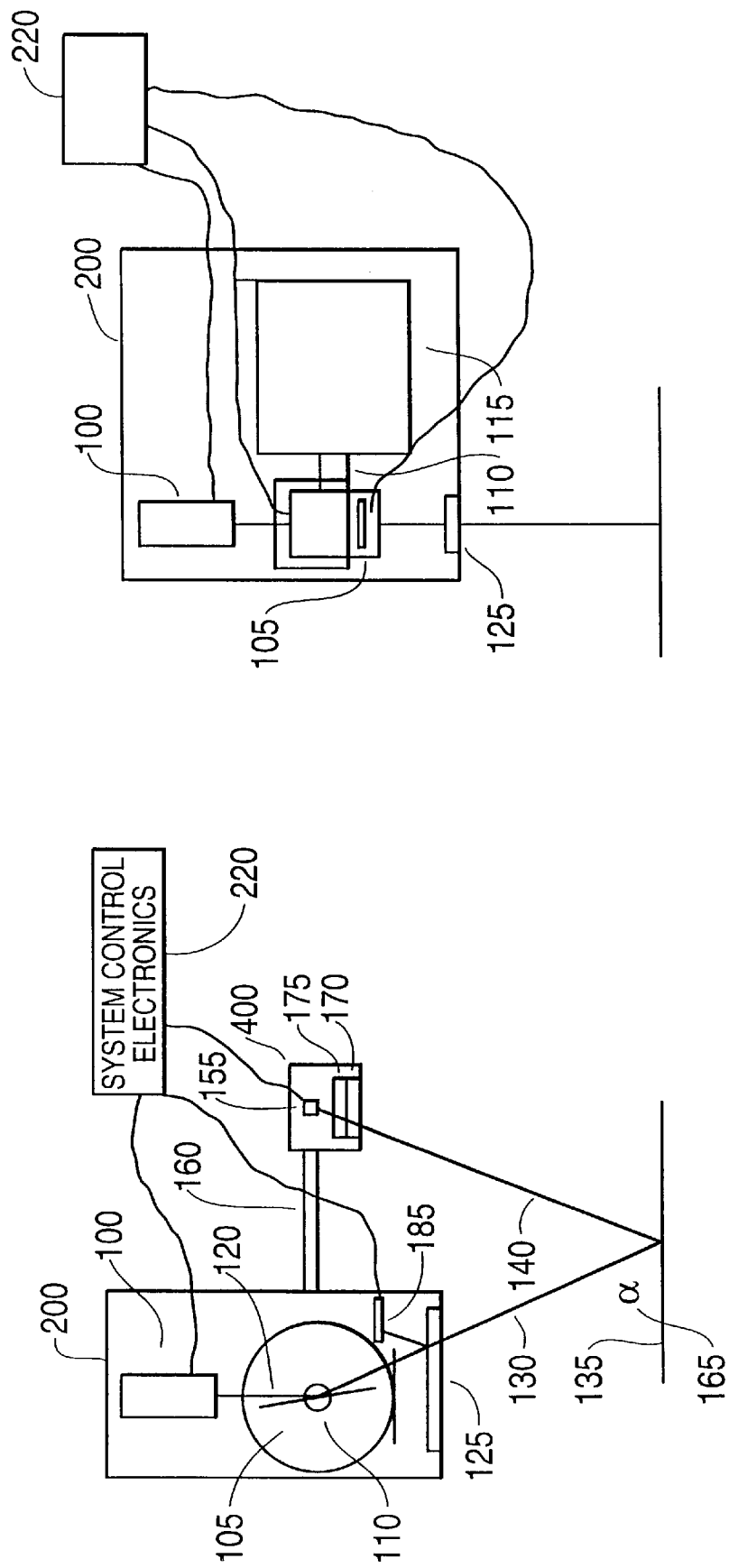
FIG. 2 comprises a schematic of a level measuring system in which a laser beam is steered and reflected from the liquid surface.
Figure 3:
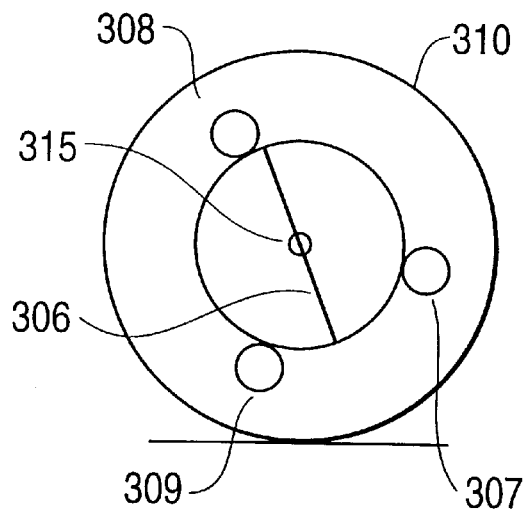
FIG. 3 comprises a schematic of an alternate means for implementing a steering optics where the steering optic is circular in cross-section and constrained by rollers.

An alternative means for steering the laser beam is illustrated in FIG. 3 whose operation may be described with reference to FIG. 2. A steering optic 305 is directly attached to the shaft of a motor 310, and the shaft of the motor 315 is used to drive a steering optic 305 that itself is constrained by rollers 307, 308 and 309. The steering optic 305 has a reflective surface 306 embedded in it while its outside surface is circular.

After reflection by the steering optic 105, the light beam 120 is incident upon a flat window 125. Some of the light that is incident on said window 125 is reflected, either due to the refractive index change between the gas; for example, air, in the housing 200 and the window material, or because a partially reflective coating was placed on the interior (to the housing) or exterior surface of the window. In a preferred embodiment, the window is flat with the interior surface uncoated and the exterior surface antireflection coated. Thus, the partially reflected light results from the air-window refractive index inequality (approximately 4% reflection). Alternatively, the window 125 could have optical power in one or more axes. The window 125 is preferably made of molded acrylic but could also be made of float or ground glass or other optically transparent material. The window 125 serves also to isolate the container and the vapor that resides above the fluid from sparks that might occur inside the housing 200.

The light 130 that is transmitted by the window 125 is incident on the surface of the liquid 135 below. The specular reflection 140 from the quiescent surface 135 of the liquid returns to the detector subassembly 400. In a preferred embodiment the detector 155 is narrow in a direction parallel to the plane of incidence of the laser beam, and long in a direction perpendicular to said plane of incidence. The length of the detector 155 is chosen so that uncertainty in the orthogonality of the surface 135 to the plane of incidence can be accommodated. A window 170 is used to protect the parts in the detector subassembly 400 and to isolate the gases in the container from any spark that might occur at the electrical components inside the detector subassembly housing. In addition, a spectrally narrow filter 175 with its pass band centered on the laser 100 wavelength is placed between the detector 155 and the window 170. Said filter 175 improves the signal to noise ratio by reducing ambient light that is generally not in the pass band.

Figure 4:
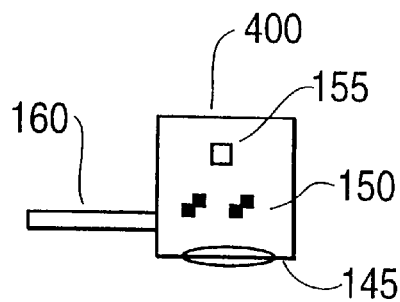
FIG. 4 comprises a schematic of an alternate detector subassembly using a cylindrical lens and a diffuser.

An alternative detector subassembly 400 is shown in FIG. 4. Capturing optics 145 and 150 are between the fluid 135 and a single detector 155. The capturing optics 145 have optical power in a single dimension such that the light is redirected in a direction orthogonal to the axis 160 that connects the single detector 155 and the source housing 200. In a preferred embodiment a cylindrical lens 145 is placed between the liquid surface 135 and the detector 155, so that it brings the light in proximity of the detector, which has in front of it a diffuser 150. The diffuser 150 ensures that even though light redirected by the cylindrical lens is not exactly in the detector 155, some of the light will be scattered into the detector 155 nonetheless.

Figure 5:
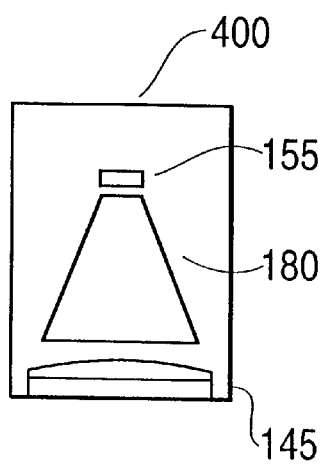
FIG. 5 comprises a schematic of an alternate detector subassembly using a cylindrical lens and a light pipe.

Still another alternative detector subassembly 400 is shown in FIG. 5. Capturing optics 145 and 180 are between the fluid 135 and a single detector 155. The capturing optics 145 have optical power in a single dimension such that the light is redirected in a direction orthogonal to the axis 160 that connects the single detector 155 and the source housing 200. In a preferred embodiment a cylindrical lens 145 is placed between the liquid surface 135 and the detector 155, thus bringing the light in to proximity of the detector, which has in front of it a tapered light pipe 180. The possible angles of incidence onto the light pipe and the shape of the light pipe are designed so that once light has passed into the tapered lightpipe it is internally reflected until it reaches the output face near the detector. Alternatively, a tapered optical element 180 has sides except that its entrance and exit faces are coated with a reflective coating such as aluminum. Light then entering the tapered optical element is singly or multiply reflected until it reaches the detector.

Figure 6:
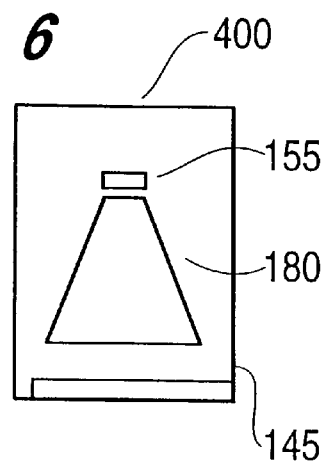
FIG. 6 comprises a schematic of an alternate detector subassembly using a tapered reflective truncated pyramid.

In another embodiment of the detector subassembly 400 the powered optic 145 is omitted in the subassembly shown in FIG. 6, and the light pipe 180 is sufficient to collect all of the light of interest on to the detector. As the angle α 165 of the source light 130 incident on the liquid interface 135 is changed, the signal from the optical detector 155 reaches and passes through its maximum value. When at its maximum value, the geometry of the light path is known within the uncertainty introduced by the plane of incidence and reflection not necessarily being parallel to the force of gravity; that is orthogonal to the plane of the liquid surface. Let s be the separation between the detector 155 and the point at which the source laser beam is incident on the steering optic 105. The distance s is fixed by the member 160 that connects these two parts of the invention. For simplicity of explanation set the heights the same. If the heights were not the same, then the geometry would be more complex. However, it would be known from the design and the distance of the fluid from the axis 160 connecting the source and detector would be compatible regardless. The distance is given by:

$$d = s/2 \cot(\alpha)$$

The light that is partially reflected from the interior surface of the window 125 is incident on a linear detector array 185 set at an optical distance from the interior surface of the window such that the position on the linear array 185 corresponds to an angle α 165 at which the source laser beam is incident on the fluid surface 135. This correspondence between angle α 165 and the position along the detector array 185 at which the signal is a maximum can be computed from the particular design geometry or it can be determined by measuring the angle at which light leaves the window.

The system control electronics 220 control the laser 100, the linear array 185 that calibrates angle of incidence 165, the single detector 155, and the steering motor 115. The particulars of these electronics can be designed in many ways that are known in the art. For purposes of explanation, a particular use scenario is discussed. The power for the system may be remote and limited, either batteries or a solar panel, which in either case are best conserved by sampling only as often as necessary. For example, some of the factors that would influence the frequency of interrogating the fluid level of an oil field storage tank for both inventory and environmental protection purposes are flow rate, severity of ambient weather conditions, local political stability and the known physical condition of the facility. Thus, the system electronics are put on a schedule and use minimal power in a shutdown mode between sample times. When a sample time begins, the laser 100 is turned ON and allowed to stabilize its directionality, the steering optics 105 are then rotated while the linear array output 125 is input into sample and hold circuitry. The sample and hold circuitry may comprise a multiplicity of sample and hold circuits with buffers to maintain a history of the array 185 output. The output of the input signal is monitored by a peak detection circuit, which may also comprise a multiplicity of peak detection circuits with buffers. In the case of both the linear array 185 and the single detector 155 the multiplicity of sampling circuits and buffers can be used to reduce the effects of noise. That is, a peak in overall trend at the peak detection circuit can be discriminated against spurious noise and correlated with a particular position on the linear array. The particular position on the linear array 185 then corresponds to an angle of incidence 165 and therefore a depth of the fluid level. The depth and time are then recorded locally or are transmitted to a central processing unit that typically monitors many similar tanks.

Figure 7:
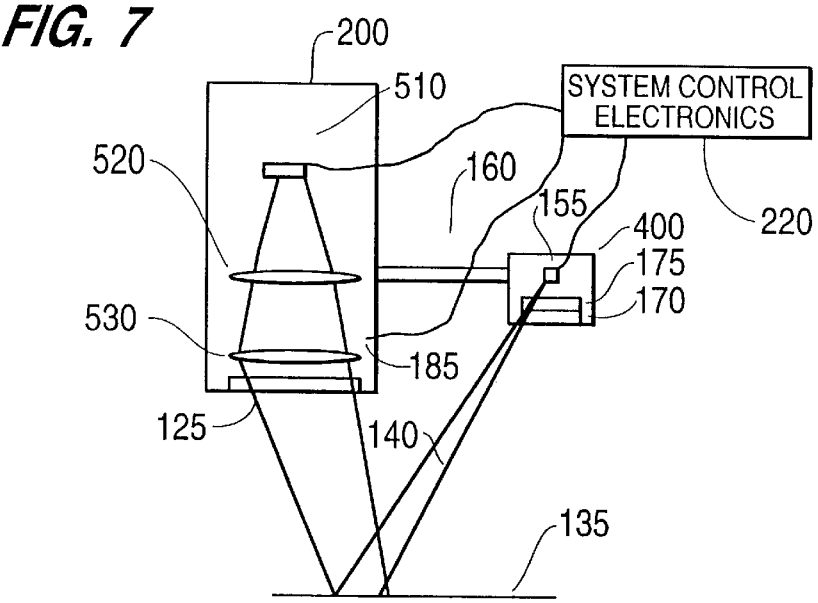
FIG. 7 comprises a schematic of a source that uses variable focus onto a detector.

In another preferred embodiment shown in FIG. 7, a light source 510 such as a light emitting diode is used as the illuminating source and is incident upon focusing optics 520, 530. Alternatively, the light source 510 can be a diode laser that is either expanded and recollimated or is made divergent with another optical element such as a lens, sphere, or a non-Lambertion scatterer such as the materials offered by Physical Optics Corporation in Torrance, Calif. In a preferred embodiment, the focus is variable by adjusting the distance ($\delta$) between the two optical elements 520, 530. The relative lens position is adjusted by translating the second lens 530 with respect to the first 520 along the system optical axis using a fine pitch screw drive. Alternatively the first lens 520 can be translated with respect to the second 530 or they may both be moved so that the relative separation changes as well as the distance of the first lens 520 with respect to the source 510. The known applied voltage corresponds to the translation $\delta$. Knowledge of the translation is sufficient to calculate the distance at which the source is focused.

The thin lens formula for a single lens is $$\frac{1}{S_1} + \frac{1}{S_2} = \frac{1}{f}$$

where $s_1$, is the distance from the object to the lens, f is the lens focal length and $s_2$ is the image distance. Let $s_1$ be the distance from the source to the first lens 520 and $\delta$ the separation between the first 520 and second lens 530, r the distance from the second lens 530 to the detector 550 after specular reflection from the surface 540, and $f_1$ and $f_2$ the focal lengths of the first 520 and second lenses 530 respectively. Then r is given by $$r = \frac{f_2[\delta(s - f_1) - f_1 s]}{(s - f_1)(\delta - f_2) - f_1 s}$$

The detector 550 is either made very small or has an aperture placed in front of it so that the aperture or the detector is the same size or smaller than the minimum spot size given the accessible range in the value of r. The lens separation $\delta$ is varied until the signal on the detector reaches a maximum, at this point the distance r is the image distance of the source 510 form the second lens 530. From r and the separation of the source 510 and detector 550 one can compute the distance of the liquid level 135 from the detector 550, whence from the known geometry of the tank the volume of fluid in the tank can be computed.

Alternatively, the lens separation is monitored using a second source or, equivalently, light derived from the primary source. A flat reflective surface is part of each lens comprising the focusing optics lens pair.

In addition to the measuring of the fluid level at the top surface, a means for measuring the depth of the interface between oil, which rises to the top, and water, which resides at the bottom of the tank, is needed. In this preferred embodiment, the water depth is measured by using an acoustic method. An acoustic source is mounted near the top of the tank and its mechanical housing is preferably integral to the housing of the optics assembly for detection of the top surface depth.

An acoustic source is made to "ping," i.e., a temporally short acoustic pulse is created. At any interface at which the acoustic velocity differs from one medium to the next, some part of an incident acoustic wave, or wave packet, will be reflected. The acoustic source is preferably spatially phased so that it is more collimated than an arbitrary acoustic source. The collimation is sufficient to minimize "noise" from reflections from surfaces that are not of interest such as the walls of the tank.

An acoustic detector is placed in proximity to the acoustic source. The detector records the time of the original pulse, the time from the original pulse to the first reflection from the top surface, the time from the original pulse to the reflection from the water/oil interface, and the time from the original pulse to the bottom of the tank. These time of flight measurements, the known acoustic velocity in each of the media, and the geometry for the tank are sufficient to determine the volume of water in the tank. It should be noted that the accuracy of this measurement is typically less accurate than optical methods and it is therefore preferred that the overall tank liquid depth in the tank be measured optically.

Figure 8:
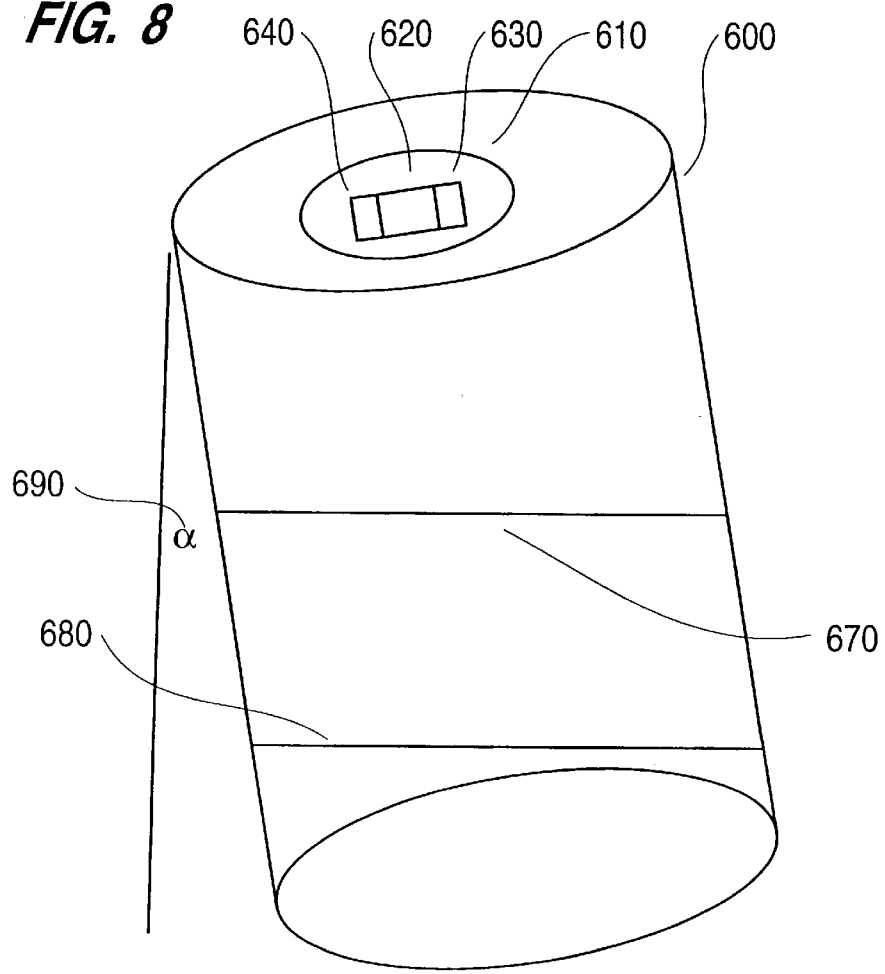
FIG. 8 illustrates the various subsystems on a tilted cylindrical tank with two fluids immiscible in each other.

Referring to FIG. 8, there is shown the various subsystems on a tilted cylindrical tank 600 with two fluids, such as oil and water, immiscible in each other. The water is shown below line 680 while the oil is shown between line 680 and line 690. The angle $\alpha$ represents the degrees of tilt from vertical of the cylindrical tank shown. The apparatus of the present invention is shown mounted on the hatch or cover 620 of the tank, where the ceiling of the tank is represented by numeral 610. Portion 640 is the laser depth finding apparatus and portion 630 may be the acoustic pinging and detector apparatus.

While the surface of the fluid will necessarily be perpendicular to the gravitational acceleration vector, the fluid surface may not be truly perpendicular to the walls of a normally upright cylindrical vessel or parallel to a floor or a ceiling 610 thereof. Consequently, the fluid surface boundary will, in general, trace out an ellipse (in stead of a circle). For installed and uncharacterized vehicles, this poses the problem that a change in fluid level cannot immediately be translated into a change in volume. However, for the special case of vessels with parallel walls, and cylindrical vessels in particular, knowledge of the number of degrees out of plumb or α of the tank walls is sufficient to allow computation of volume changes from measured fluid level changes. Moreover, this variance from plumb can, in a preferred embodiment, be accomplished by attaching a level to the side of the vessel whose readout is sent to central processor 10 (FIG. 1). The volume change can thereby be computed from the level change. In yet another embodiment, if the top of the tank is perpendicular to the vessel walls or if the orientation of the housing with respect to vessel walls is known, then the level can be placed inside the housing.

These and other features of the invention will be appreciated from the claims that follow which should not be deemed to be limited by the embodiments described above. All patent applications and patents referenced herein should be deemed to be incorporated by reference as to their entire contents.

What we claim is:

1. Apparatus for determining the depth of a vessel or the depth of a substance in said vessel comprising a fixed optical emitter for emitting light into the vessel, a light steering means for steering light emitted by the fixed optical emitter to reflect from a surface of one of the vessel and a substance within the vessel, a detector for receiving the reflected light, and a processing system for determining a distance from the surface of the vessel or substance in accordance with an angle of the steered light or the reflected light.

2. Apparatus as in claim 1 wherein said optical emitter, said light steering means, and said detector are contained within a housing and said processing system is remote from said housing, said apparatus further comprising optical fiber cable for coupling said housing and said processing system.

3. Apparatus as in claim 1 further comprising a level for reporting a signal corresponding to a number of degrees out of plumb to said processing system.

4. Apparatus as in claim 1 further comprising an acoustic transmitter and an acoustic receiver for reporting the incidence of an acoustic pulse reflected from a fluid surface.

5. Apparatus as in claim 4 wherein said processing system determines a depth of a first liquid in a tank and a depth of a second liquid in a tank, the first liquid being immiscible in the second liquid.

6. Apparatus as recited in claim 1 wherein said optical emitter and said light steering means are located in a housing, the housing further comprising a window for receiving the steered light prior to transmission to the vessel.

7. Apparatus as recited in claim 1 wherein said vessel further comprises valves for regulating vessel contents and said processing system outputs an output signal to said valves in the event the determined distance is outside of expected limits.

8. Apparatus for determining the depth of a vessel or the depth of a substance in said vessel comprising a fixed acoustic transmitter and a fixed acoustic receiver mounted to a cover of said vessel, a level for reporting a signal corresponding to a number of degrees out of plumb and a processing system for calculating the depth of said vessel or the depth of the substance in said vessel.

9. A method for determining the depth of a vessel or the depth of a substance in said vessel comprising emitting light into the vessel from a fixed point, steering the light emitted into the vessel to reflect from a surface of one of the vessel and a substance within the vessel, detecting the reflected light, determining an angle of the steered light or the reflected light, and determining a distance from the surface of the vessel or substance based on the determined angle.

10. A method for determining depth as recited in claim 9 further comprising the step of reporting a signal corresponding to a number of degrees out of plumb to a processing system for determining distance.

11. A method for determining depth as recited in claim 9 further comprising the step of reporting the incidence of an acoustic pulse reflected from a fluid surface.

12. A method for determining depth as recited in claim 9 further comprising the step of receiving the steered light at a window after the steered light is steered, but before the steered light reflects from the surface of the vessel or substance within the vessel.

13. A method for determining depth as recited in claim 9 further comprising the step of comparing an expected distance to a determined distance.

14. A method for determining depth as recited in claim 13 further comprising the step of issuing an output signal in the event the comparison results in the distance values being substantially different.

15. A method for determining depth as recited in claim 13 wherein the expected distance value comprises a prior determined distance value.

16. A method for determining depth as recited in claim 14 wherein said output signal comprises a signal to regulate valves of the vessel.

17. A method for determining depth as recited in claim 14 wherein said output signal comprises a signal for communicating a warning to individuals proximate to the vessel.

18. A method for measuring the depth of a vessel or the depth of a substance in the vessel, comprising the steps of:

emitting light from an optical emitter, through a first optic, through a second optic, to a surface of the vessel or substance;

detecting, at a detector, a reflection of the light from the surface of the vessel or substance;

varying the distance between the first optic and the second optic until the detected reflection is at a maximum strength at the detector; and determining the depth of the vessel or the depth of the substance in the vessel using the distance between the first and second optic.

19. The method of claim 18, further comprising the steps of:

emitting an acoustic pulse in the vessel;

detecting, at an acoustic detector, a first reflection of said acoustic pulse from a first surface;

determining the time elapsed between emitting the acoustic pulse and receiving the first reflection;

detecting, at said acoustic detector, a second reflection of said acoustic pulse from a second surface;

determining the time elapsed between emitting the acoustic pulse and receiving the second reflection;

determining the distance between the first surface and the second surface based on the elapsed times.

20. The apparatus of claim 1, where said angle is an angle between the steered light or the reflected light and the surface of the substance in the vessel.

21. The apparatus of claim 1, where said angle is an angle between the steered light or the reflected light and a surface of the vessel.

22. The apparatus of claim 1, where said angle is an angle between the steered light or the reflected light and true plumb.

\* \* \* \* \*